(12) United States Patent
Moberg

(10) Patent No.: US 7,605,339 B1
(45) Date of Patent: Oct. 20, 2009

(54) METHODS OF FORMING AN ANNULAR UNDERCUT

(76) Inventor: Clifford A. Moberg, N71 W29922 Tamron La., Hartland, WI (US) 53029

( * ) Notice: Subject to any disclaimer, the term of this patent is extended or adjusted under 35 U.S.C. 154(b) by 232 days.

(21) Appl. No.: 11/602,712

(22) Filed: Nov. 21, 2006

(51) Int. Cl.
*B23H 1/00* (2006.01)
*B23H 7/26* (2006.01)
*B23H 9/04* (2006.01)

(52) U.S. Cl. .................................. 219/69.17; 219/69.2
(58) Field of Classification Search .............. 219/69.15, 219/69.17, 69.2; 264/219
See application file for complete search history.

(56) References Cited

U.S. PATENT DOCUMENTS

| | | | | |
|---|---|---|---|---|
| 3,041,442 | A * | 6/1962 | Ullmann et al. .......... | 219/69.15 |
| 3,562,702 | A * | 2/1971 | Celovsky ................. | 219/69.17 |
| 3,975,608 | A | 8/1976 | Ullmann ...................... | 219/69 |
| 4,096,371 | A | 6/1978 | Lozon ......................... | 219/69 |
| 4,100,388 | A | 7/1978 | Meyer ........................ | 219/69 |
| 4,242,557 | A | 12/1980 | Sato et al. ...................... | 219/69 |
| 4,703,142 | A | 10/1987 | Dzewaltowski et al. ....... | 219/69 |
| 4,767,904 | A | 8/1988 | Braden et al. ................. | 219/69 |
| 4,841,126 | A | 6/1989 | Graeber ..................... | 219/69.2 |
| 4,888,462 | A | 12/1989 | Diot et al. .................. | 219/69.2 |
| 4,992,639 | A | 2/1991 | Watkins et al. ............. | 219/69.2 |
| 5,207,385 | A | 5/1993 | Turner ..................... | 239/533.3 |
| 5,900,350 | A * | 5/1999 | Provost et al. .............. | 264/219 |
| 5,922,222 | A * | 7/1999 | Jens et al. ................. | 219/69.17 |
| 6,224,807 | B1 * | 5/2001 | Clune ......................... | 264/219 |
| 6,384,364 | B1 | 5/2002 | Wei et al. .................. | 219/69.17 |
| 6,419,101 | B1 | 7/2002 | Hessel et al. | |
| 6,627,835 | B1 | 9/2003 | Chung et al. ............. | 219/69.12 |
| 6,688,501 | B2 | 2/2004 | DeGroot et al. | |
| 6,712,983 | B2 | 3/2004 | Zhao et al. ...................... | 216/2 |
| 6,849,554 | B2 | 2/2005 | Rattner et al. ................ | 438/706 |
| 6,935,543 | B2 | 8/2005 | DeGroot et al. | |
| 6,964,346 | B1 | 11/2005 | Taber et al. | |
| 7,007,383 | B2 | 3/2006 | Przybylski et al. .......... | 29/889.7 |
| 2003/0012921 | A1 * | 1/2003 | Gallant et al. ................ | 264/219 |

FOREIGN PATENT DOCUMENTS

| | | | |
|---|---|---|---|
| DE | 2520750 | A * | 11/1975 |
| GB | 1526485 | A * | 9/1978 |
| JP | 2006-272419 | A * | 10/2006 |

OTHER PUBLICATIONS

USPTO Manual of Patent Classification, Electric Spark Machining.

* cited by examiner

*Primary Examiner*—Geoffrey S Evans
(74) *Attorney, Agent, or Firm*—Jansson Shupe & Munger Ltd.

(57) ABSTRACT

A method is provided for electrical discharge machining (EDM) a workpiece to include an annular undercut having a curved cross-sectional shape. The annular undercut is useful, for example, in making devices such as the tooling for plastic injection-molding of plastic parts including crab's claw seals. According to embodiments of the method, a workpiece is rotated about a central workpiece axis. An energized EDM electrode is moved in a plane containing the central axis and about an electrode axis generally perpendicular to the plane toward the rotating workpiece to provide a spark gap between the shaped electrode tip and the body. At least portions of the undercut are then formed by the EDM electrode as the workpiece is rotated. Devices made according to the forming methods are described.

19 Claims, 12 Drawing Sheets

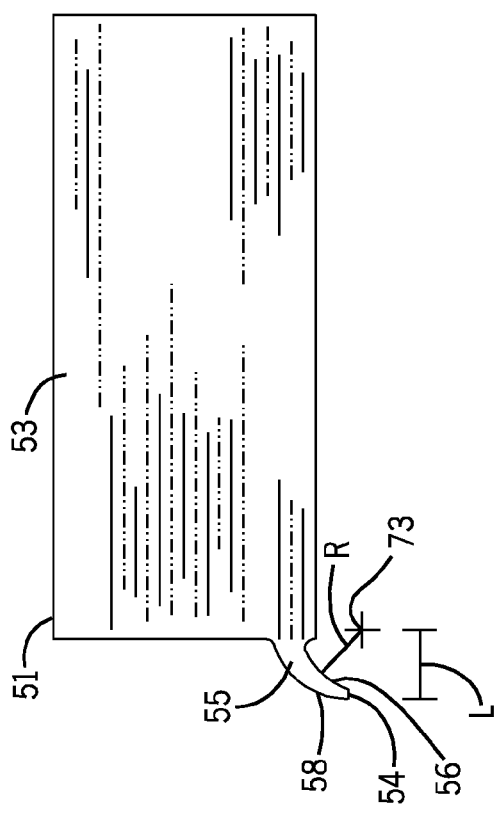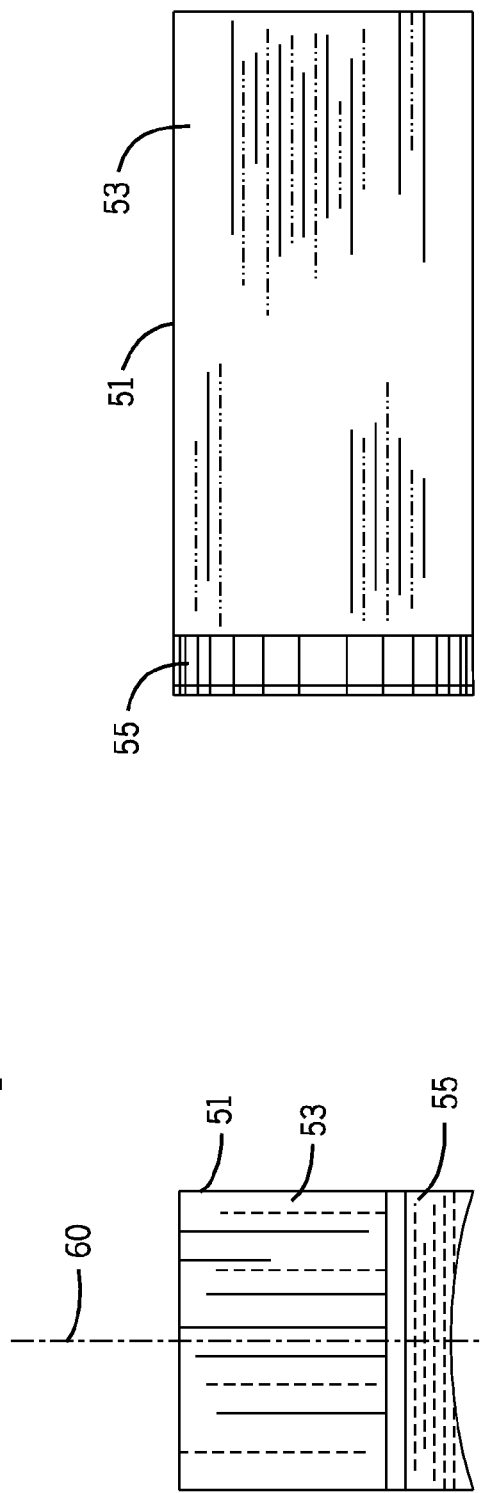

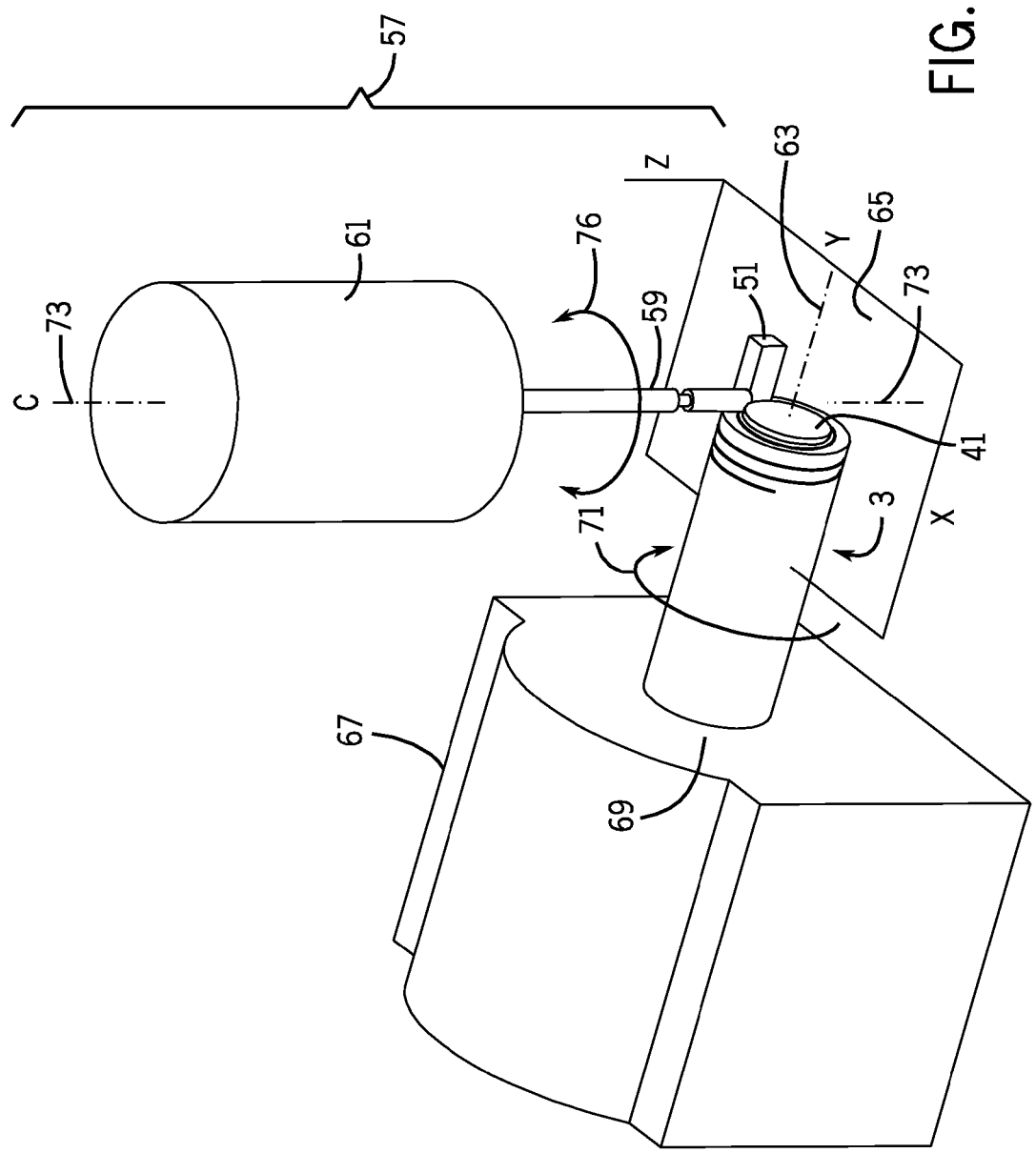

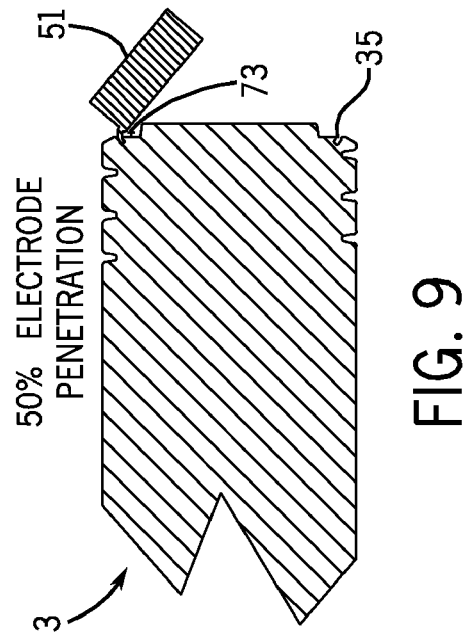
FIG. 8 INITIAL ELECTRODE CONTACT
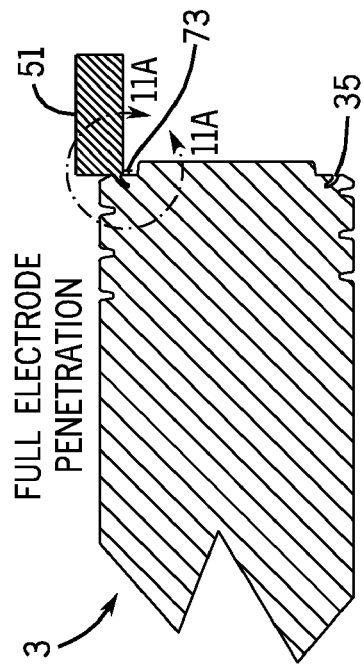
FIG. 9 50% ELECTRODE PENETRATION
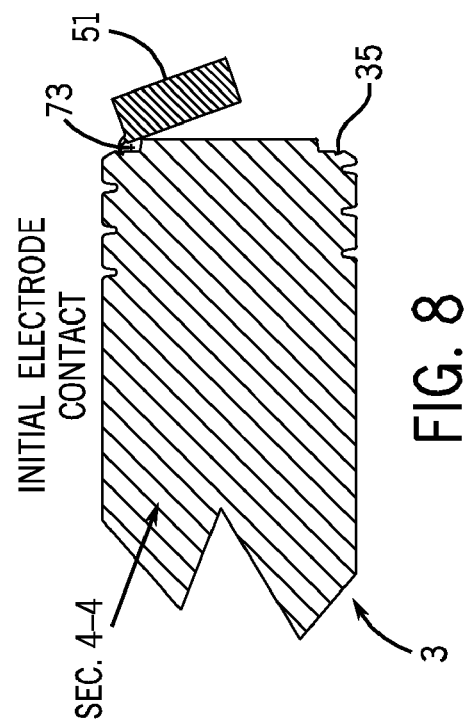
FIG. 10 75% ELECTRODE PENETRATION
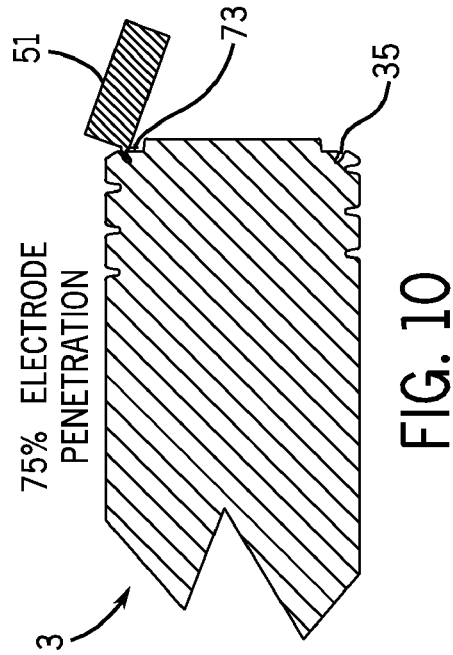
FIG. 11 FULL ELECTRODE PENETRATION

METHODS OF FORMING AN ANNULAR UNDERCUT

FIELD

The field relates generally to electric spark machining and, more specifically, to formation of an undercut-type opening in a device.

BACKGROUND

Manufacturers of injection-molded parts are increasing called upon to provide high quality, complex parts at the lowest possible cost. These demands, in turn, require the development and use of molds and mold tooling capable of producing these complex parts in the most efficient manner possible.

Injection-molded parts with integral sealing surfaces represent one such category of complex and difficult-to-manufacture parts. The sealing surfaces of these parts must provide a durable and reliable liquid or gas-tight seal between mating parts and must typically do so under rigorous conditions of use. Exemplary parts including integral sealing surfaces include caps and closures for food and personal care product containers, automobile headlight housings and enclosures.

The sealing surfaces of these parts typically protrude from, or extend away from, the finished injection-molded part and have a generally curved protruding profile when viewed in side section. The sealing surface is typically formed of a pliant plastic material which is compressed when pressed against the mating part, thereby forming a gasket-like seal between the parts. Certain of these sealing surfaces are referred to in industry as a "crab's claw" seal because of the general resemblance between the appearance of the sealing surface (when viewed in side section) to the profile of a crab's claw.

The tooling utilized to manufacture injection-molded parts including protruding sealing surfaces must include a "negative" surface, or cavity, into which the molten plastic material flows to form the sealing surfaces. Such tooling can be extraordinarily difficult to manufacture because of the difficulty in forming the cavity with the requisite tolerances using conventional forming techniques.

Because conventional technology is unable to provide the requisite high-precision cavity in a single tool, conventional practice has been to use a two-piece core. For example, conventional tooling required to manufacture an injection-molded closure for food and personal care product containers includes a two-piece core and a corresponding cavity in which the core is located. The two-piece core forms the inside surfaces of the closure and the cavity forms the outer closure surfaces.

The two-piece core for forming the protruding sealing surfaces includes (1) the core and (2) an insert part seated in the core. More specifically, the core is machined at one end to provide a female opening including an annular deck having curved walls about the periphery of the opening and a space for receiving a male insert part. The insert part is provided with curved walls about its periphery and is seated in the core opening. The curved walls of the deck and seated insert part form a cavity into which molten plastic material flows to form the sealing surface during the injection-molding process.

Use of a two-piece core carries with it important disadvantages. A two-piece core can unduly prolong each production cycle because the structure of such cores is not optimally conducive to removal of heat energy from the plastic part and mold. The duration of an injection-molding production cycle is dependent on the rate at which the plastic cools after injection into the mold. The mold cannot be opened until the plastic cools sufficiently so as to retain the shape of the molded part.

To accelerate cooling, the core is typically provided with an inner channel or passageway through which a coolant, such as water, is circulated. The coolant removes heat from the core and injection-molded part and facilitates reduction of cycle time.

The coolant passageway cannot extend through the core proximate the distal core end because of the obstruction created by the insert part opening. Any improvement in heat removal would increase the rate of part cooling, decrease production cycle time and reduce manufacturing costs.

Moreover, any requirement that the core include plural parts imposes additional costs on the manufacturer and can lead to manufacture of defective parts if the insert and core are not in complete registry.

The need to remove material in the form of an undercut from metal-containing workpieces and devices is not limited to the tooling industry. Manufacturers of valves, nozzles and other devices can benefit from the use of high-precision undercuts in the manufacture of these types of devices.

It would represent a significant improvement in the art to provide a method of making an undercut and devices including an undercut which would provide the manufacturer with an improved degree of control over device manufacture, which would provide improved devices and which would provide an opportunity for cost control.

BRIEF DESCRIPTION OF THE DRAWINGS

The invention may be understood by reference to the following description taken in conjunction with the accompanying drawings, in which like reference numerals identify like elements throughout the different views. The drawings are not necessarily to scale, emphasis instead being placed upon illustrating the principles of the invention.

FIGS. 6A, 6B and 6C are, respectively, side, front and top views of an exemplary EDM electrode.

FIG. 7 is a diagrammatic view of the mold core of FIG. 3, portions of an EDM machine and an electrode during forming of an exemplary undercut.

FIGS. 8, 9, 10 and 11 are diagrammatic cross-sectional views, taken along a section such as section 4-4 of FIG. 3, showing an electrode performing a set of motions to form an undercut in a mold core workpiece.

DETAILED DESCRIPTION

The methods described herein relate to formation of an undercut in a device using electrical discharge machining (also referred to herein as "EDM"). A device refers to a thing made for a particular purpose. A workpiece is a type of device and refers to a piece of work being machined. An undercut means or refers to an opening in a device or workpiece in which material is removed from the device or workpiece so as to leave a portion of the device or workpiece overhanging the opening. Such an undercut is cut under or below a surface.

EDM is a machining technique used for precision engineering of micro holes, micro shafts and a variety of complex shapes. In general, EDM is a process whereby material is removed through erosive action by control of electrical discharges, or sparks, between an electrode and a workpiece. The electrode is typically made of graphite or copper. The workpiece is made of an electrically-conductive material. The electrode is positioned closely adjacent the workpiece leaving a small gap therebetween referred to as a "spark gap." The electrode and workpiece are separated by a dielectric fluid flushing medium, such as oil. Other examples of flushing medium fluids are synthetic oil and deionized water.

The electrode is energized by the EDM machine to provide electrical discharges. Each electrical discharge removes a small amount of material from the electrode and workpiece. Some of the removed material is removed by the dielectric fluid while certain other portions of the removed material reattach to the surface of the electrodes. By proper selection of the EDM machine control parameters, the material removed from the electrode can be kept at least an order of magnitude smaller than the material removed from the workpiece resulting in formation of the desired precision opening. EDM machines are commercially available, for example, from Sodick, Inc. of Schaumburg, Ill.

Figure 2:
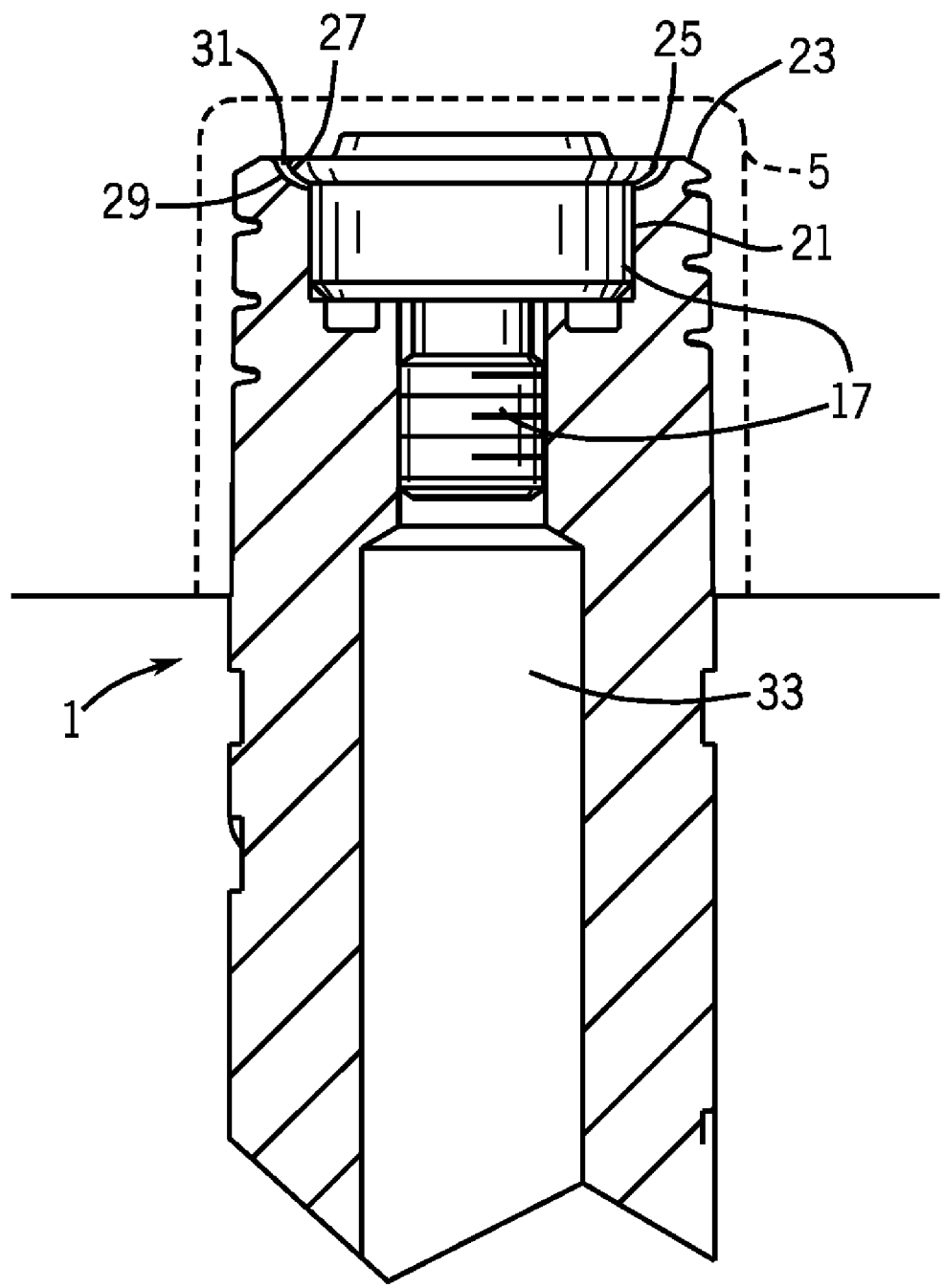
FIG. 2 is a partial sectional view of a prior art mold core portion used to make plastic injection-molded parts including a crab's claw seal.
Figure 3:
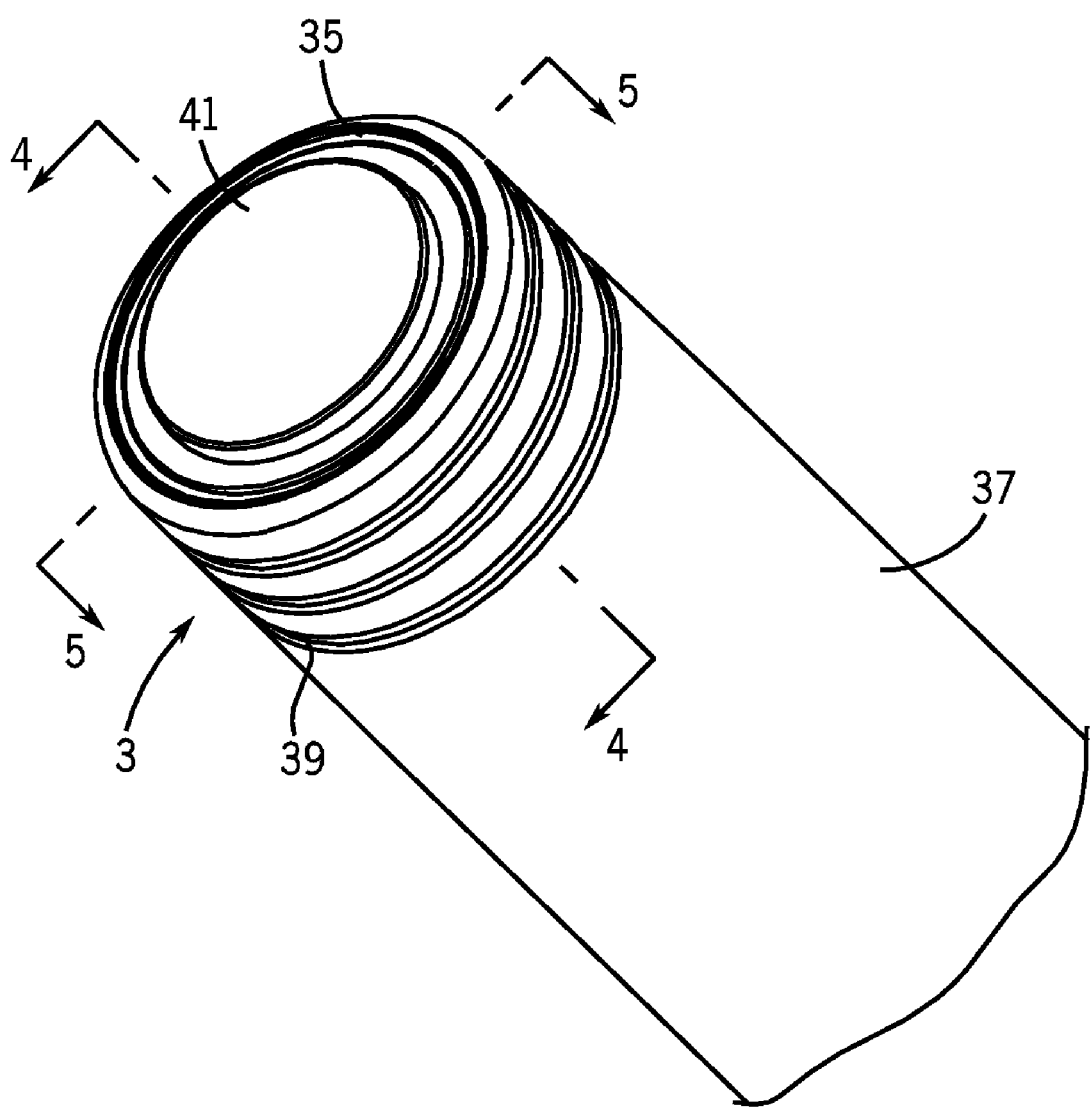
FIG. 3 is a perspective view of an exemplary device comprising a mold core portion used to make plastic injection-molded parts including a crab's claw seal according to the present improvement.

Referring to FIGS. 2-5 and 7-12, one category of devices in which formation of a high-precision undercut is desirable are the tools used to make plastic injection-molded parts including small protrusions, such as a crab's claw seal. Exemplary tools for use in making a plastic part with a crab's claw seal are mold core portion 1 or 3 and a corresponding cavity portion. (Cavity 5 shown in phantom line in FIG. 2 is provided as a reference point only; it does not represent the cavity required to make closures 9-13.) Core 1 shown in FIG. 2 is a conventional core portion, not including an undercut while core 3 shown in FIGS. 3-5 and 7-12 is an improved core including an undercut made according to the methods described herein.

Figure 1A:
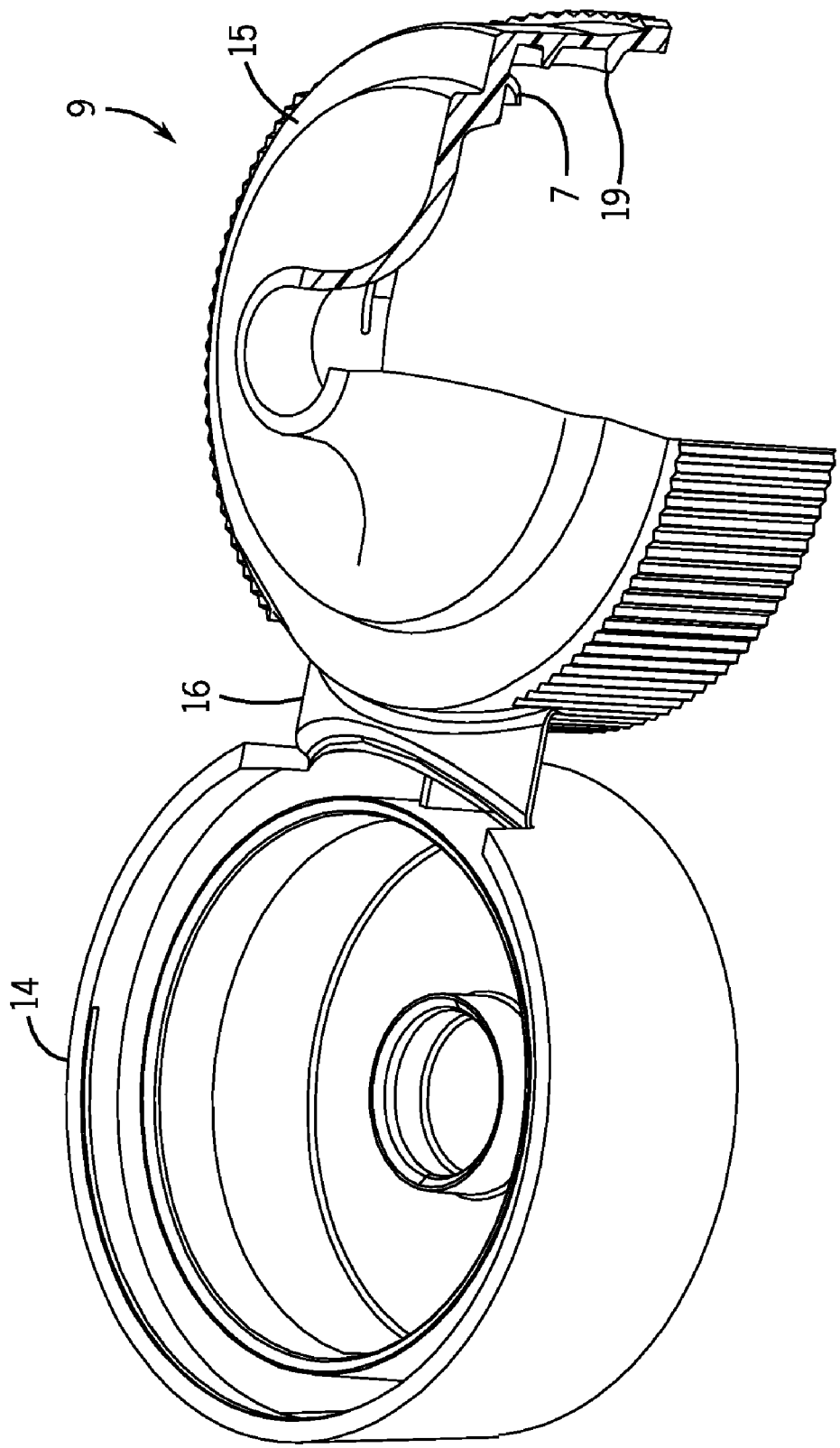
FIGS. 1A, 1B and 1C show exemplary closures, each including a "crab's claw" seal. Portions of the closures are cut away to provide a partial section view of each crab's claw seal.
Figure 1B:
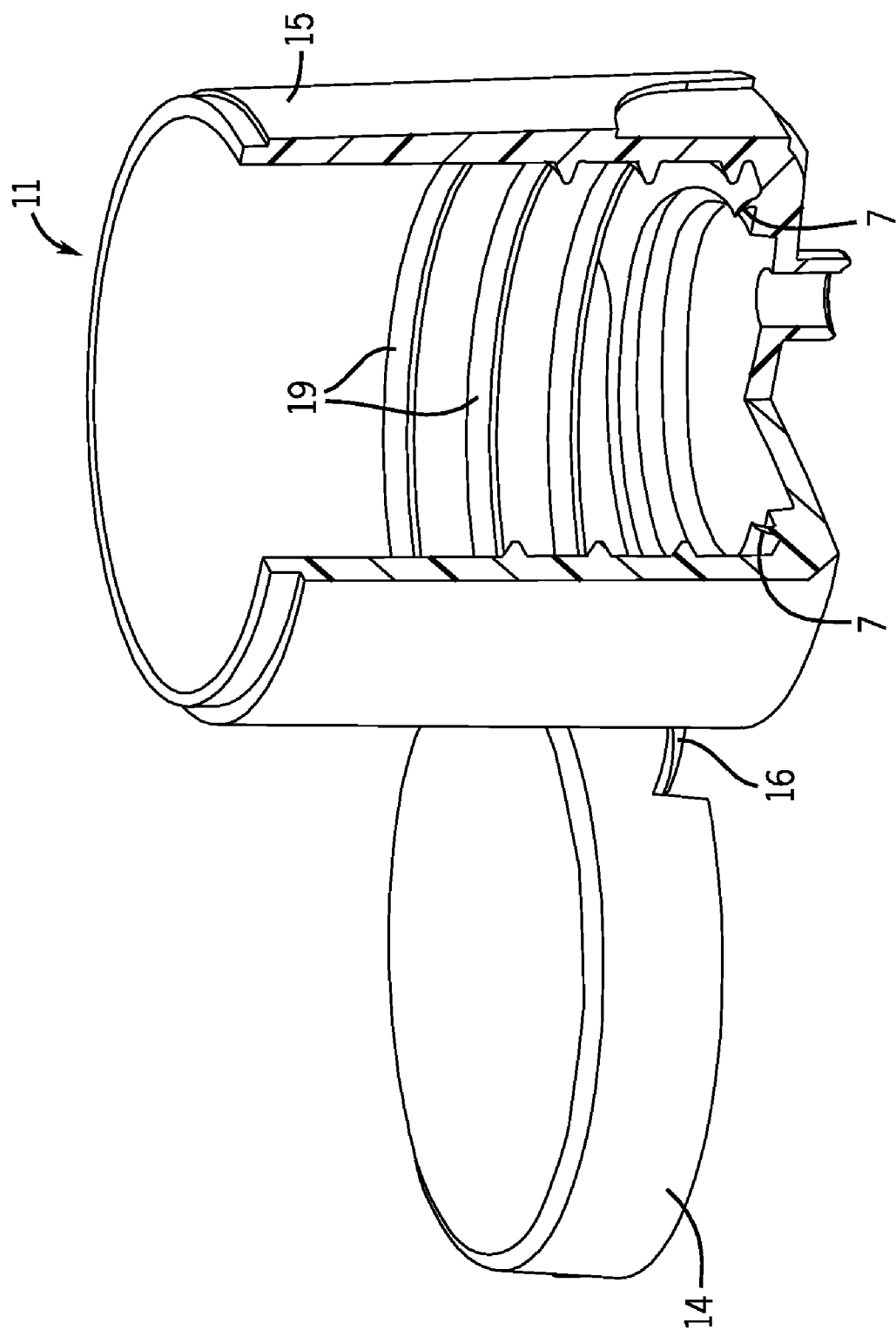
Figure 1C:
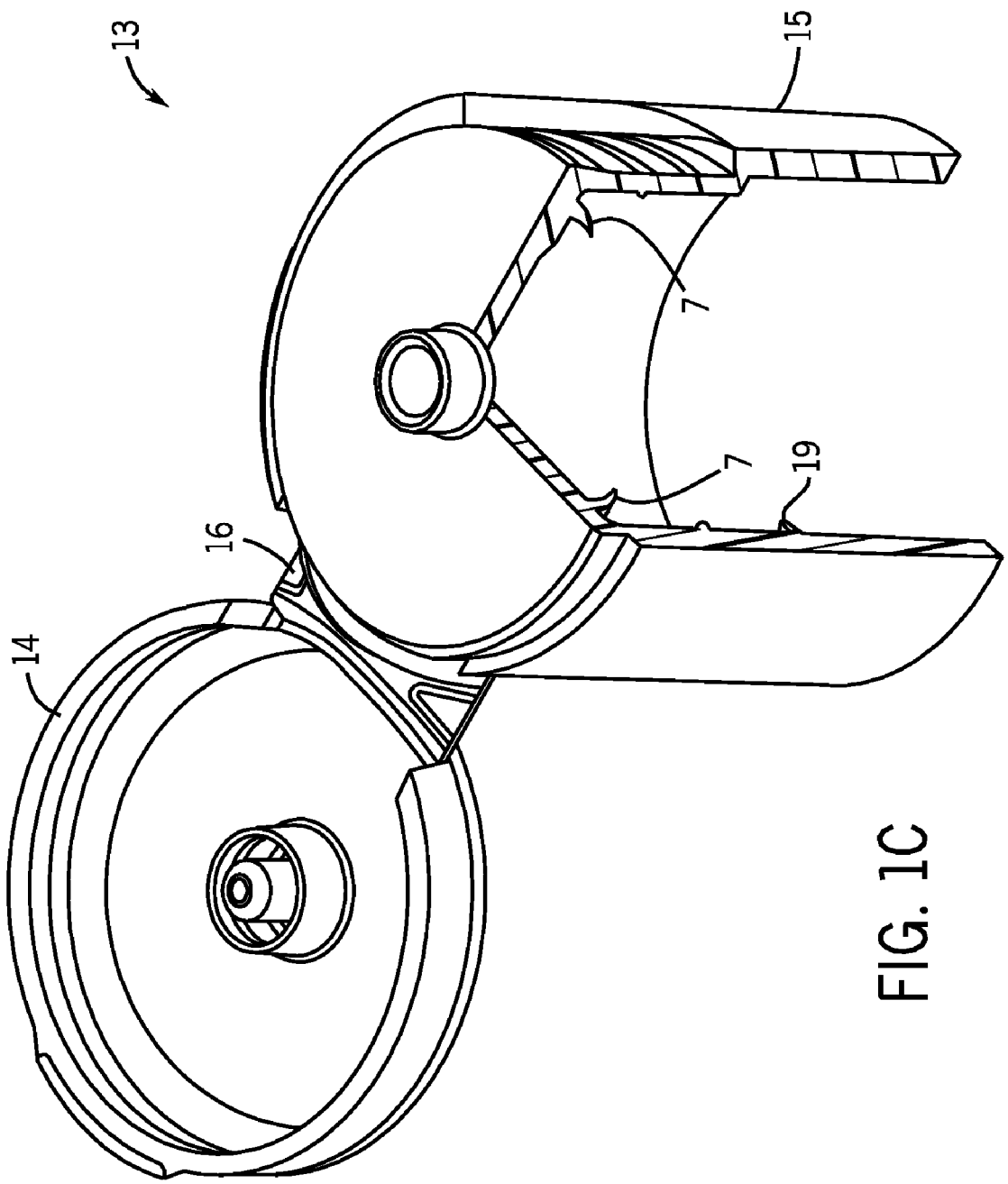

Such a core 1, 3 is used to make plastic injection-molded parts, such as the exemplary closures 9, 11, and 13 shown in FIGS. 1A, 1B and 1C. Closures 9-13 are of the type used as screw-on caps for personal care product containers (e.g., shampoo, hair conditioner or like containers) or for food product containers (e.g., ketchup, mayonnaise, etc.). The exemplary closures 9-13 are one-piece plastic parts including a cap portion 14 joined to a base portion 15 by a hinge 16.

The exemplary closures 9-13 are screwed onto the neck of a container by engagement of threads 19 with mating threads (not shown) on the container. Each closure 9-13 forms a fluid and gas-tight seal with the neck of the container (not shown) on which the closure 9-13 is seated by means of the crab's claw seal 7. The exemplary crab's claw seals 7 shown are generally annular in shape with a footprint which corresponds to the upper edge surface of the container neck (not shown) on which the closure is seated. As shown in the section views of FIGS. 1A-1C, the exemplary crab's claw seals 7 have a pronounced symmetric curvature with pliant walls having a generally uniform wall thickness. These characteristics permit each crab's claw seal 7 to form a gasket-like or O-ring-like seal between the closure 9-13 and its container.

Because conventional CNC-type machining processes are incapable of making a high-precision undercut capable of producing a protrusion such as a crab's claw seal 7, the tooling industry has resorted to use of two-piece mold cores 1, with attendant disadvantages. The two-piece mold core 1 portion shown in FIG. 2 includes core 1 and insert 17. Core 1 forms the inside surfaces of the closure and the corresponding mold cavity 5 forms the outer closure surfaces. Insert 17, having a generally "T-shaped" appearance in section, is seated in corresponding opening 21 machined in end 23 of core 1. Insert 17 flange 25 has an annular curved wall surface 27 which, when inserted, is spaced apart from annular curved deck surface 29 machined in core 1 forming annular cavity 31 into which molten plastic is injected to form the crab's claw seal 7.

The two-piece core 1 is not optimally efficient for manufacturing plastic injection-molded parts with the shortest time-duration manufacturing cycles. This is because coolant passageway 33 is truncated and does not extend fully to the distal end 23 of core 1 because of opening 21 required for insert 17. This core 1 structure limits the ability of the coolant in passageway 33 to remove heat from the mold (e.g., core 1, insert 17 and cavity 5) and plastic part (e.g., closures 9-13) thereby increasing the amount of time required before the molded plastic is hardened sufficiently to be ejected from the mold and prolonging the manufacturing cycle. Any unnecessary prolongation of the manufacturing cycle decreases efficiency and increases costs to the manufacturer.

Referring next to FIGS. 3-5 and 7-12, core 3 represents an improved device because it includes an EDM-formed annular undercut 35. (Core 3 is also referred to herein as a "workpiece.") Core 3 is useful for making a crab's claw seal 7 in a closure base, such as the base 15 associated with closures 9-13. Because core 3 is provided with an EDM-formed undercut 35, core 3 can be manufactured as a one-piece tool thereby avoiding any requirement for an insert 17 and providing important advantages, including those described in detail below.

FIGS. 3-5 and 12 show a finished-form core 3, or workpiece, with an exemplary EDM-formed annular undercut 35. In the embodiment, core 3 has a cylindrically-shaped core body 37 made of an electrically-conductive material. Exemplary materials are S-7, H-13 and A-10 tool steels and copper alloys. Cavities 39 for forming closure threads 19 are machined in body 37. Core 3 end 41 includes undercut 35 formed, or machined, therein. EDM removal of core 3 material forms annular overhang 43 and annular curved inner 45 and outer 47 walls defining undercut 35 therebetween. When mated with a corresponding mold cavity, such as mold 5, molten plastic can be injected into undercut 35 to form a protruding part, such as crab's claw seal 7.

Figure 4:
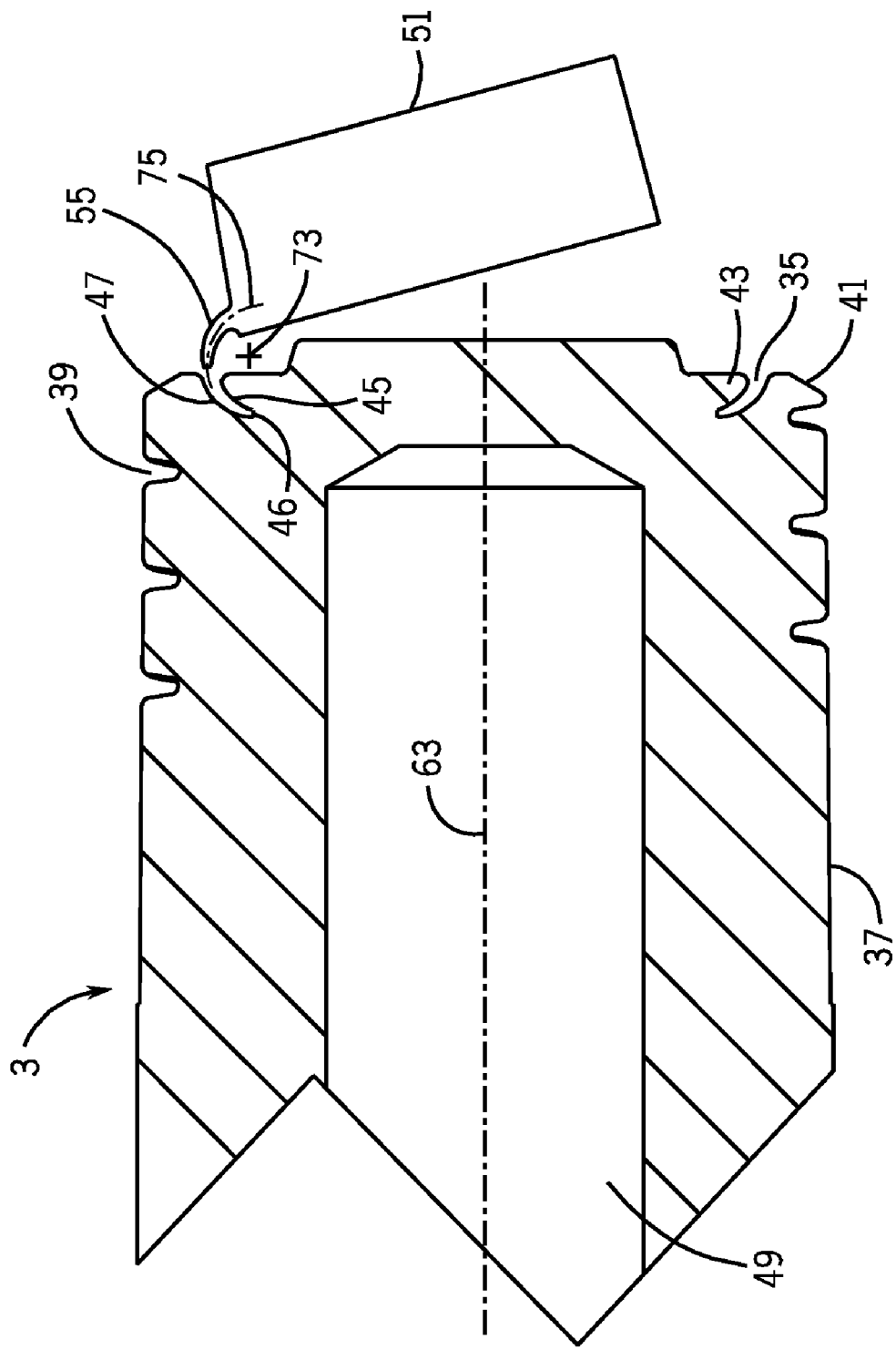
FIG. 4 is a sectional view of the mold core portion of FIG. 3 taken along section 4-4 of FIG. 3. An exemplary EDM electrode is also shown.
Figure 5:
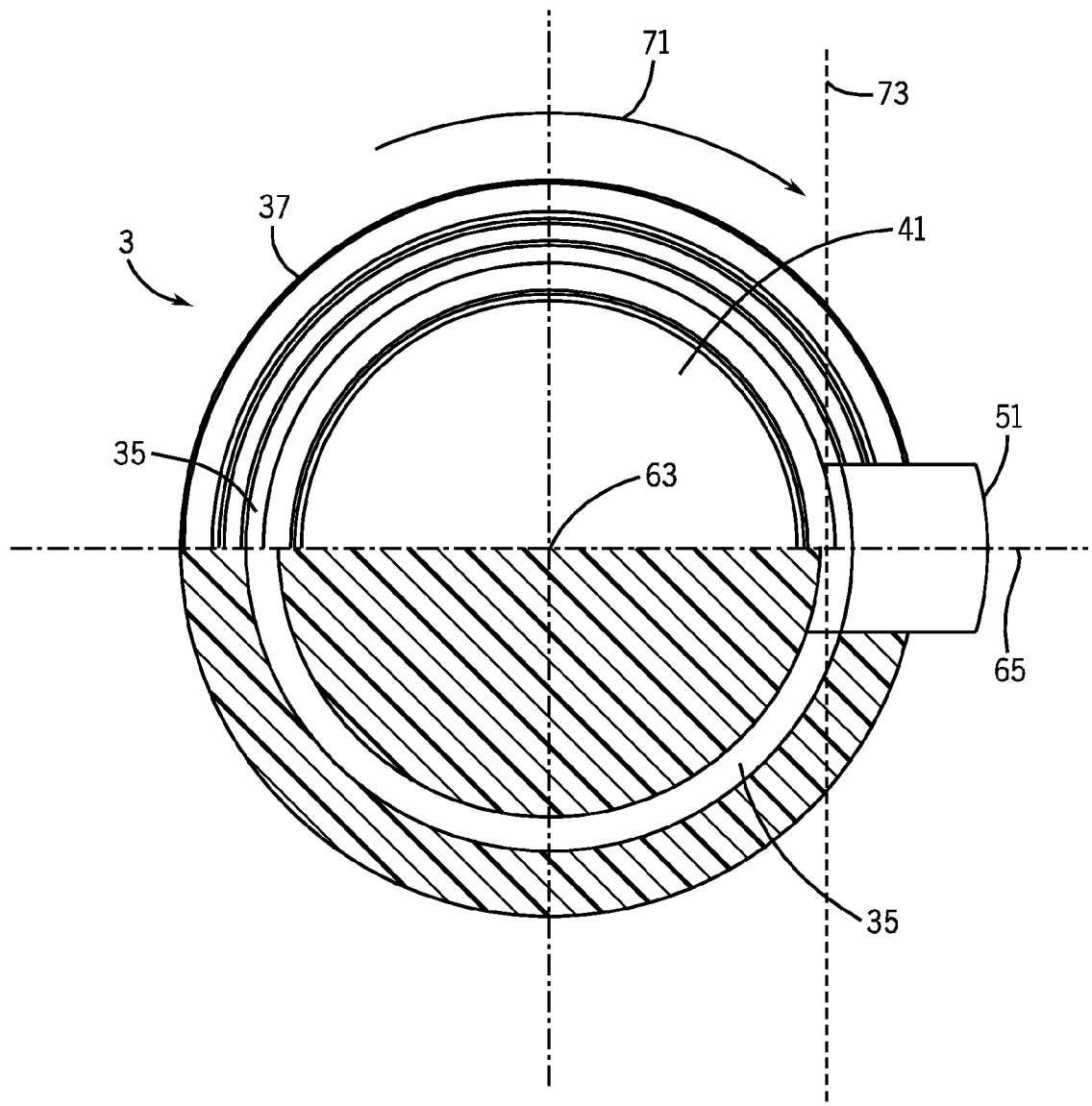
FIG. 5 is an end view and a partial sectional view of the mold portion of FIG. 3 taken along section 5-5 of FIG. 3. An exemplary EDM electrode is also shown.

Because undercut 35 renders insert 17 unnecessary, coolant passageway 49 can be extended more fully through core body 37 closely proximate end 41 as is apparent by comparison of cores 1 and 3 of FIGS. 2 and 4. Significantly improved heat removal is provided by extension of the passageway 49 closer to end 41 of core 3.

Comparative tests in a plastic-injection-molding production setting have demonstrated that the improved core 3 is significantly more efficient than core 1. More specifically, it has been determined that, on average, use of core 3 in place of core 1 reduces cycle time required for part cooling by about 47% and reduces the overall plastic injection-molding cycle time by approximately 20%. Extrapolated over thousands of cycles, this represents an enormous improvement, permitting a manufacturer to make more parts at a lower cost per part. Therefore, the capability of providing undercut 35 in the device represented by core 3 provides an opportunity for important performance benefits to the plastic injection molder.

Referring now to FIGS. 6A-6C there is shown an exemplary EDM electrode 51 used in the process of EDM forming of undercut 35 in a device such as workpiece/core 3. In the example, a plurality of electrodes are used to form undercut 35 and preferably each electrode is identical to electrode 51. The description of electrode 51 is applicable, therefore, to each other electrode used to form undercut 35.

Electrode 51 has an electrode body 53 and an integral electrode tip 55. Tip 55 is constructed to be progressively advanced into the surface of workpiece/core 3 by EDM machine 57, parts of which are shown in FIG. 7. Preferably, tip 55 is machined or otherwise provided with a shape which is generally complementary, or closely similar to the cross-sectional shape of the desired undercut. Stated another way, tip 55 shape corresponds generally to the cross-sectional undercut 35 shape as can be seen, for 5 example, in FIG. 11A. Since material is removed from the workpiece during EDM, the tip 55 cannot be identical to the undercut 35. In the example, tip 55 includes a length L and a radius of curvature R corresponding to the cross-sectional shape of undercut 35. Tip includes end 54, concave surface 56 and convex surface 58. It is preferred, but not required, that electrode 51 be generally planar, for example along plane 60. Electrode body 53 is supported by EDM machine 57 electrode holder 59 as described below. Each electrode 51 is made of a material suitable for use in EDM machining. Exemplary materials include graphite and copper.

Plural electrodes are required to form an undercut having the cross-sectional shape and depth such as that shown in FIGS. 4 and 8-12 because each electrode 51 is degraded during EDM forming as noted above. The number of electrodes 51 utilized will depend on factors such as workpiece material density, electrode material density and other factors such as the type of dielectric fluid used and power generation capabilities of the EDM machine utilized. In the example, as many as 20-50 electrodes, each identical to electrode 51, may be required to make an undercut 35 having a lineal depth of 0.050 inches in a tool steel or copper alloy workpiece/core 3. As improvements in electrode technology advance, fewer electrodes may be required.

Use of identical electrodes 51 is preferred for reasons of ease of manufacture and cost. However, it is not required that each electrode 51 have the same shape because EDM machine 57 can be programmed to position electrodes of different shapes relative to the workpiece to achieve the desired undercut.

Referring now to FIG. 7, each electrode 51 is mounted on a multi-axis EDM machine 57. Preferably, each electrode 51 is held in the chuck of a separate electrode holder 59 which in turn is interchangeably supported by ram 61 of EDM machine 57. EDM machine 57 may, for example, be a five-axis EDM machine available from Sodick, Inc. under Model No. AQ55-L. The EDM machine 57 progressively advances each electrode 51 into the surface of workpiece/core 3 to remove material from the workpiece/core 3 during formation of undercut 35. EDM machine 57 utilizes multiple axes to position each electrode 51 including x-, y-, z- and c-axes as described in further detail below in connection with FIGS. 8-11A. The c-axis is also referred to herein as the "electrode axis."

As shown in FIGS. 3-5 and 7, exemplary workpiece/core 3 has a generally cylindrical shape. Workpiece/core 3 has a central axis 63 which lies in an imaginary plane 65 bisecting workpiece/core 3. While a generally cylindrically-shaped workpiece is shown, it is to be understood that an undercut in a workpiece having a shape other than that of a cylinder may be formed according to the processes described herein.

Referring again to FIG. 7, workpiece/core 3 is supported for EDM machining about axis 63 by a rotatable holder, such as rotary fixture 67. Rotary fixture 67 includes a motor (not shown) in power-transmission relationship with chuck 69. The motor rotates chuck 69 with workpiece/core 3 held in chuck 69. Rotary fixture 67 and workpiece/core 3 supported thereon are submersed in a bath (not shown) containing dielectric medium for EDM machining of undercut 35. In the example, rotary fixture 67 rotates workpiece/core 3 in a clockwise direction indicated by arrow 71. Rotary fixture 67 rotates workpiece/core 3 at any suitable rate. For purposes of forming an undercut, such as undercut 35 in a tool steel or copper alloy workpiece/core 3, a rate of ten revolutions per minute (RPM) is typical.

FIGS. 3-5 and 8-11A show a process for EDM-forming an annular undercut 35 in workpiece/core 3 using an electrode 51 that is mounted on multi-axis EDM machine 57. Initially, EDM machine 57 is programmed with a set of instructions for positioning each electrode 51 proximate workpiece/core 3 and for progressively advancing the plurality of electrodes 51 into the workpiece/core 3 to form undercut 35. The instructions further control withdrawal of each degraded electrode 51 so that a new electrode 51 may be substituted in place thereof.

The instructions position each electrode 51 (supported in electrode holder 59 and ram 61) along x-, y- and z-axes of a Cartesian coordinate system proximate workpiece/core 3. EDM machine 57 is further programmed to pivot the positioned electrode 51 about a c-axis 73 (the "electrode axis") so that electrode tip 55 moves toward workpiece/core 3 within plane 65 bisecting workpiece/core 3. As a plane, such as plane 65, can be infinitesimally small, electrode 51 may project above and/or below plane 65. In the example shown, curved electrode tip 55 is moved at least partially along a curved path 75 (FIGS. 4, 7, 11A) by pivoting movement of electrode 51 about c-axis 73 in the directions of dual-headed arrow 76. (i.e., Toward workpiece/core 3 for undercut forming and away from workpiece/core 3 for electrode tip 55 withdrawal.) In the example, the instructions are such that the location of c-axis 73 relative to workpiece/core 3 will remain constant as each identical exemplary electrode 51 is advanced progressively into workpiece/core 3 to form portions of undercut 35. However, EDM machine 57 may be programmed to change the position of c-axis 73, even if the electrodes 51 are identical, should a particular orientation of electrode 51 relative to workpiece/core 3 be required. And, the position of c-axis 73 may be changed relative to the workpiece/core 3 if the electrodes differ in shape in order to achieve the desired undercut. Thus, c-axis 73 may be in fixed or variable positions relative to workpiece/core 3.

Figure 11A:
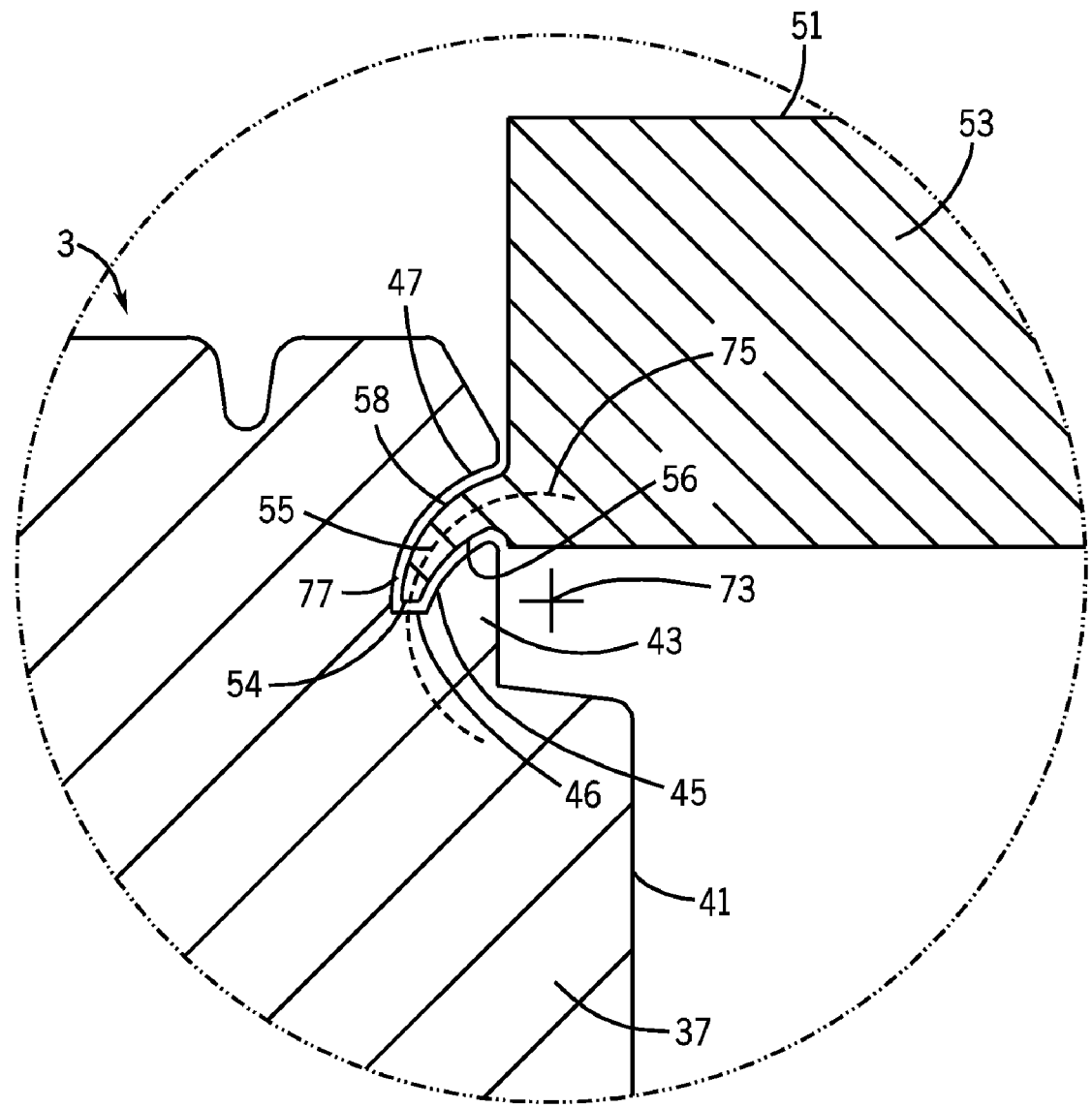
FIG. 11A is an enlarged portion of FIG. 11 showing an exemplary spark gap between the electrode and mold core workpiece.

As shown in FIG. 11A, EDM machine 57 controls movement of electrode 51 so that the electrode 51 is advanced only enough to maintain a generally uniform spark gap 77 between the electrode tip 55 outer surfaces 54, 56, 58 and sides 45, 46, 47 of undercut 35. EDM machine 57 maintains a generally consistent spark gap 77 of between about 0.0015-0.002 inches between the surfaces 54, 56, 58 of tip 55 and corresponding undercut 35 surfaces 45, 46, 47 of workpiece/core 3 once such surfaces 54, 56, 58 enter workpiece/core 3 during advancement of each electrode 51 toward workpiece/core 3 as workpiece/core 3 is rotated about central axis 63.

The processes for forming an annular undercut 35 described herein represents the recognition that an EDM machine 57 c-axis 73 can be used to control the advancement of the curved tip 55 of an EDM electrode 51 to progressively form an annular undercut having a curved cross-sectional shape in a rotating workpiece. This represents a new use of EDM technology because, typically, EDM machines are used to cut or machine material from a workpiece with lineal reciprocation along x-, y- and/or z-axes, singularly or in combination. The c-axis 73 is typically used to re-orient the electrode for multiple-workpiece operations or to maneuver the EDM electrode so that the electrode surfaces are used evenly throughout the forming process. This utilization of EDM provides a type of high-precision machining not possible with conventional computer numeric controlled-type (CNC) machining.

Exemplary steps of a method of forming an annular undercut in a workpiece/core 3 will now be described in connection with FIGS. 7-12. The particular order in which the steps are carried out is not critical provided undercut formation occurs during workpiece rotation. EDM machine 57 moves electrode 51 to an initial electrode contact position shown in FIG. 8 so that a spark gap 77 is provided between tip distal end 54 and workpiece/core 3. A spark gap 77 of between about 0.0015-0.002 inches is preferred. In the example, electrode 51 is pivoted about c-axis 73 with tip 55 moving along a curved path 75 in the shape of an arc. Workpiece/core 3 may be rotating, or may be stationary, at the time tip 55 is moved into position. In no particular order, EDM machine 57 energizes electrode 51 and workpiece/core 3 rotation is commenced if rotation has not previously been commenced. Electrode 51 may be energized at any suitable voltage and amperage, 12 Volts and 1 to 1.5 Amps is typical. Electrode 51 pivots about c-axis 73 in plane 65 advancing tip 54 progressively toward workpiece/core 3 while maintaining a generally consistent spark gap 77 as material is removed from workpiece/core 3 to form at least a portion of undercut 35. Tip 55 may be advanced toward workpiece/core 3 as material is eroded and as the workpiece/core 3 is rotated or tip 55 may be held in a stationary position.

As each electrode 51 is degraded, it is withdrawn from undercut 35 in a direction opposite to that in which it was advanced. In the example, the degraded electrode 51 and the electrode holder 59 supporting electrode are replaced with a new electrode 51 mounted on a further electrode holder 59 so that a further cycle of EDM machining can be performed. Each electrode 51 may, for example, require replacement after 200 rotations of workpiece/core 3 for a typical rate of workpiece/core 3 rotation of ten RPMs. For each successive cycle of EDM machining, EDM machine 57 positions the new electrode 51 proximate workpiece/core 3. The new electrode 51 is moved about c-axis 73 with electrode tip 55 positioned proximate to undercut 35 of rotating workpiece/core 3 while maintaining a generally consistent spark gap 77 between surfaces 54, 56 and 58 and undercut walls 45, 46, 47. By consistent, it is meant that the spark gap 77 remains similar, but not necessarily identical, for each electrode 51 with a preferred spark gap 77 being in the range of between about 0.0015-0.002 inches. As noted above, the new electrode 51 may be held in a fixed position relative to workpiece/core 3 or may be advanced toward workpiece/core 3 as workpiece/core 3 is rotated based on the rate at which undercut formation is desired by the operator. Preferably, each movement of the new electrode 51 causes electrode tip 55 to move along a curved path 75 towards and away from workpiece/core 3. In the example, each new electrode 51 tip 55 is moved one after the other in plane 63 about axis 73 to a position further advanced toward the rotating workpiece/core 3 while maintaining spark gap 77. This sequential process of substituting new electrodes 51 for degraded electrodes 51 is repeated to progressively enlarge the undercut 35 until undercut 35 formation is completed.

Figure 12:
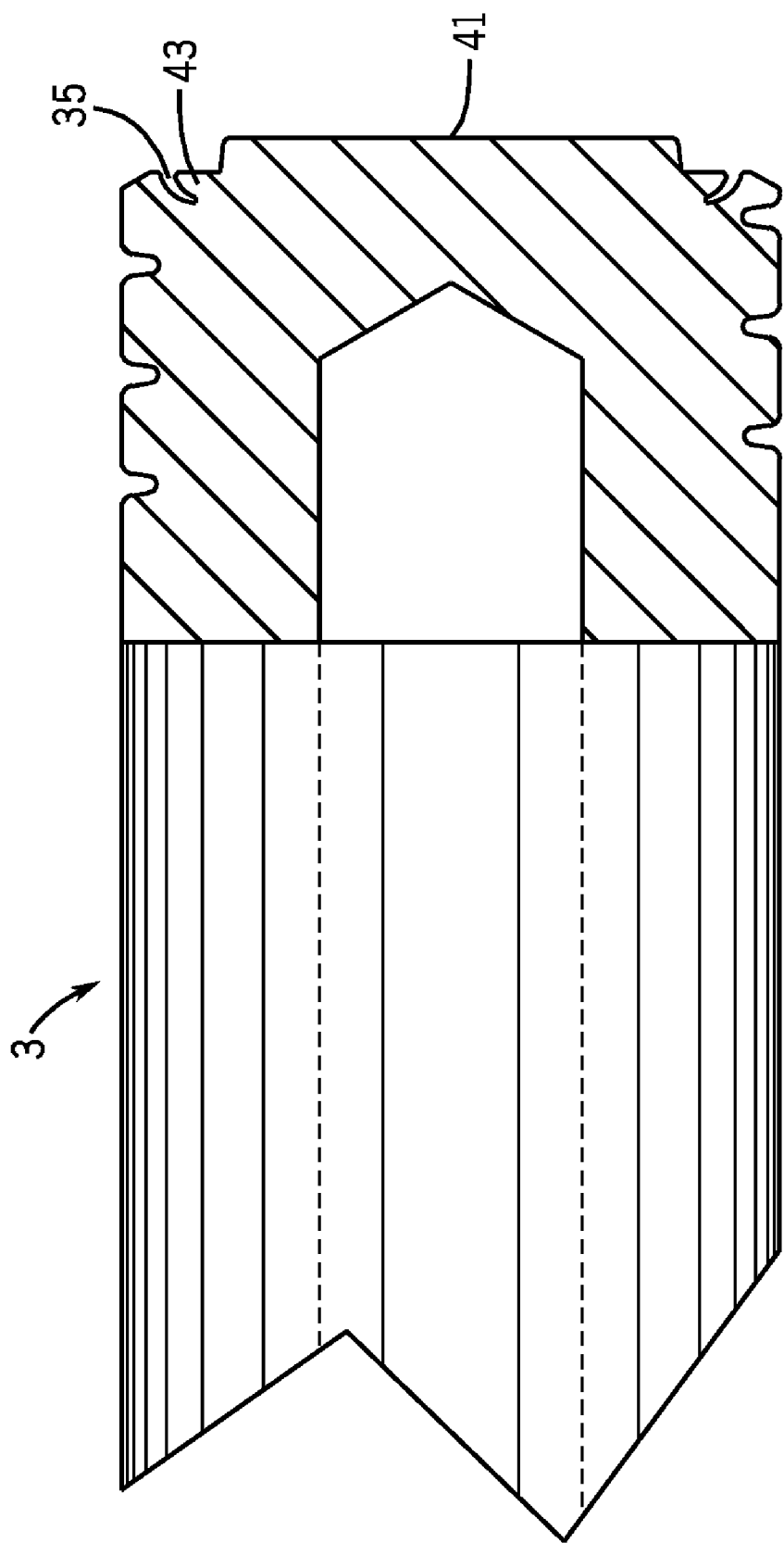
FIG. 12 is a sectional view of a mold core workpiece with a finished undercut taken along section 5-5 of FIG. 3.

FIGS. 8, 9, 10, 11 and 11A illustrate exemplary positions of electrode 51 during EDM-forming of undercut 35 in workpiece/core 3. In FIG. 8, electrode 51 is shown in an initial electrode contact position forming a spark gap 77 between tip end 54 and workpiece/core 3. (Spark gap 77 is best illustrated in the enlargement of FIG. 11A.) The first portions of undercut 35 are formed. In FIG. 9, a further electrode 51 is shown in a position further advanced into undercut 35 and representing 50% electrode penetration. Spark gap 77 is maintained between tip 55 and undercut walls 45, 46, 47. FIGS. 10 and 11 illustrate further electrodes 51 in positions representing, respectively 75% and full electrode penetration. Shaped electrode tip 55 is moved in plane 63 and about c-axis 73 placing tip end 54 in the positions shown in FIGS. 8-11 with a generally consistent spark gap 77 being maintained. In these examples, tip 55 travels in a arc-shaped path 75. FIG. 11A shows the position of electrode 51 at the end of the forming sequence with undercut 35 fully formed and shows the spark gap 77 between tip 55 and the walls 45, 47 defining undercut 35. FIG. 12 represents a workpiece/core 3 including a finished-form annular undercut 35. The curved cross sectional shape of undercut 35 formed by shaped electrode tip 55 is shown therein. The positions of FIGS. 8-11, therefore, represent progressive enlargement of undercut 35 from commencement of EDM forming to completion of the finished form undercut 35 of FIG. 12.

Considerable variation is possible according to the methods described herein. For example, the shape of electrode 51 and electrode tip 55 may be modified and are not limited to the shape shown and described herein. This ability to modify the shape of the electrode 51 and electrode tip 55 provides the operator with a broad range of options in fashioning an undercut with the desired shape to solve a particular problem. As a further example, undercut 35 is shown formed in end 41 of workpiece/core 3 but could be formed in positions other than end 41. And, while a single annular undercut 35 is shown and described in the figures, it is possible that more than one undercut may be provided in a workpiece.

By way of further example, the annular undercut may be offset from the workpiece central axis 61 with the workpiece rotated about a central axis of the annular undercut in order to form such undercut. Electrode tip 55 may be offset slightly from electrode body 53.

Persons of skill in the art will recognize that an undercut may be formed in a wide range of devices other than core 3. Persons of skill in the art will further recognize that devices including an undercut will have applications in fields outside the field of plastic injection-molding, for example in manufacturing valves and nozzles.

While the principles of this invention have been described in connection with specific embodiments, it should be understood clearly that these descriptions are made only by way of example and are not intended to limit the scope of the invention.

What is claimed is:

1. A method of electrical discharge machining (EDM) an annular undercut having a curved cross-sectional shape, the method comprising:

providing a workpiece having a body and a central axis;

providing an EDM electrode having a shaped tip with an outer surface corresponding to the curved cross-sectional shape of the annular undercut;

rotating the workpiece about the central axis;

energizing the electrode;

moving the shaped electrode tip in a plane containing the central axis and about an electrode axis generally perpendicular to the plane toward the rotating workpiece to provide a spark gap between the shaped electrode tip and the body; and forming, by EDM, at least a portion of the annular undercut in the body during workpiece rotation.

2. The method of claim 1 wherein the workpiece body has an end and forming includes forming the annular undercut in the end.

3. The method of claim 1 wherein the electrode axis is in a fixed-position relative to the workpiece during moving.

4. The method of claim 1 wherein the electrode axis is in a variable-position relative to the workpiece during moving.

5. The method of claim 1 further comprising moving the shaped electrode tip toward the body during forming to enlarge the undercut.

6. The method of claim 5 wherein the moving during forming maintains a generally consistent spark gap.

7. The method of claim 1 wherein the movement of the shaped electrode tip is along a curved path toward the body.

8. The method of claim 7 wherein the curved path is an arc.

9. The method of claim 1 further comprising withdrawing the shaped electrode tip from the undercut after forming.

10. The method of claim 1 further comprising:

providing a plurality of EDM electrodes, each electrode having a shaped tip corresponding to the curved cross-sectional shape of the annular undercut;

moving, one after the other, the shaped electrode tip of each electrode in the plane about the electrode axis to a position further advanced toward the rotating workpiece to provide a spark gap between the shaped electrode tip and the body; and forming, by EDM, an enlarged portion of the annular undercut in the body with the shaped electrode tip of each electrode during workpiece rotation until the finished shape of the annular undercut is fully formed.

11. A method of electrical discharge machining (EDM) an annular undercut in a workpiece comprising:

providing a plurality of electrodes, each electrode having a curved tip;

rotating the workpiece about a workpiece central axis;

sequentially moving each electrode tip within a plane containing the central axis about an electrode axis generally perpendicular to the plane such that the tips are progressively advanced proximate the workpiece and a spark gap is formed therebetween;

energizing each electrode when proximate the workpiece; and progressively forming the annular undercut with the energized electrode tips during workpiece rotation until the annular undercut is fully formed.

12. The method of claim 11 wherein the undercut has a cross-sectional shape and each electrode tip has a shape which is generally complementary to the undercut cross-sectional shape.

13. The method of claim 11 wherein the electrode axis is in a fixed-position relative to the workpiece during moving.

14. The method of claim 11 wherein the electrode axis is in a variable-position relative to the workpiece during moving.

15. The method of claim 11 further comprising moving at least one electrode tip toward the workpiece during forming to enlarge the undercut.

16. The method of claim 15 wherein the moving during forming maintains a generally consistent spark gap.

17. The method of claim 11 wherein the movement of each electrode tip is along a curved path toward the workpiece.

18. The method of claim 17 wherein the curved path is an arc.

19. The method of claim 11 further comprising withdrawing each electrode tip from the undercut after forming.

* * * * *

UNITED STATES PATENT AND TRADEMARK OFFICE
CERTIFICATE OF CORRECTION

| | | |
|---|---|---|
| PATENT NO. | : 7,605,339 B1 | Page 1 of 1 |
| APPLICATION NO. | : 11/602712 | |
| DATED | : October 20, 2009 | |
| INVENTOR(S) | : Moberg | |

It is certified that error appears in the above-identified patent and that said Letters Patent is hereby corrected as shown below:

On the Title Page Item (57) Abstract, line 13, delete "forming" and insert --EDM-forming--.

In column 1, line 12, delete "increasing" and insert --increasingly--.

In column 3, line 32, delete "electrodes" and insert --electrode--.

In column 5, line 25, after for, delete "5".

In column 5, line 30, after Tip, insert --55--.

In column 6, line 46, delete "Toward" and insert --toward--.

In column 7, line 5, delete "represents" and insert --represent--.

In column 7, line 37, delete "54" and insert --55--.

In column 8, line 3, delete "63" and insert --65--.

In column 8, line 21, delete "63" and insert --65--.

In column 8, line 24, delete "a" and insert --an--.

In column 8, line 48, delete "61" and insert --63--.

Signed and Sealed this

Twenty-ninth Day of June, 2010

David J. Kappos
*Director of the United States Patent and Trademark Office*